US010185907B2

(12) United States Patent
Lau et al.

(10) Patent No.: US 10,185,907 B2
(45) Date of Patent: Jan. 22, 2019

(54) INFORMATION BEARING DEVICES (71) Applicant: INFOTOO INTERNATIONAL LIMITED, Kowloon, Hong Kong (CN)

(72) Inventors: Tak Wai Lau, Hong Kong (CN); Wing Hong Lam, Hong Kong (CN)

(73) Assignee: INFOTOO INTERNATIONAL LIMITED, Kowloon, Hong Kong (CN)

( * ) Notice: Subject to any disclaimer, the term of this patent is extended or adjusted under 35 U.S.C. 154(b) by 0 days.

(21) Appl. No.: 15/529,249

(22) PCT Filed: Nov. 25, 2015

(86) PCT No.: PCT/IB2015/059115
§ 371 (c)(1),
(2) Date: May 24, 2017

(87) PCT Pub. No.: WO2016/084011
PCT Pub. Date: Jun. 2, 2016

(65) Prior Publication Data
US 2017/0262745 A1    Sep. 14, 2017

(30) Foreign Application Priority Data
Nov. 25, 2014    (HK) .................................. 14111916

(51) Int. Cl.
G06K 19/00    (2006.01)
G06K 19/06    (2006.01)
G06K 7/14     (2006.01)

(52) U.S. Cl.
CPC ..... G06K 19/06037 (2013.01); G06K 7/1426 (2013.01); G06K 19/0614 (2013.01);
(Continued)

(58) Field of Classification Search
CPC .................. G06K 19/0723; G06K 19/07749
(Continued)

(56) References Cited

U.S. PATENT DOCUMENTS 8,461,994 B2 *  6/2013  Kim ................... G06K 7/10475
                                                    235/462.13
2006/0163354 A1  7/2006  Tyranski et al.
2012/0256000 A1  10/2012  Cok

FOREIGN PATENT DOCUMENTS

CN    101339599 A    1/2009
CN    102576415 A    7/2012
(Continued)

OTHER PUBLICATIONS

International Search Report for PCT/IB2015/059115 dated Mar. 24, 2016.
(Continued)

*Primary Examiner* — Jamara Franklin
(74) *Attorney, Agent, or Firm* — Nixon Peabody LLP; Jeffrey L. Costellia (57) ABSTRACT An information bearing device comprising a data bearing pattern, wherein the data bearing pattern comprises a plurality of data defining elements, the data defining elements being spatially distributed to define a set of spatial frequency data, and the set of spatial frequency data comprising a plurality of frequency data elements ($F_1, F_2, \ldots, F_n$); and wherein each frequency data ($F_i$) has a data frequency magnitude ($f_i$) and a data frequency angle ($\theta_i$), the data frequency magnitude being above a first characteristic spatial frequency ($f_A$) which corresponds to a characteristic frequency of a staple or commonplace image reproduction apparatus, the characteristic frequency representing an image data frequency above which reproduction quality by the staple or commonplace image reproduction apparatus begins to drop substantially.

20 Claims, 5 Drawing Sheets (52) U.S. Cl.
CPC . *G06K 19/06056* (2013.01); *G06K 19/06093* (2013.01); *G06K 19/06131* (2013.01)

(58) Field of Classification Search
USPC .................................................. 235/487–494
See application file for complete search history.

(56) References Cited

FOREIGN PATENT DOCUMENTS

| | | | |
|---|---|---|---|
| CN | 102985934 | A | 3/2013 |
| JP | 07110847 | A | 4/1995 |
| JP | 2008225732 | A | 9/2008 |
| WO | WO 2006/001793 | A1 | 1/2006 |

OTHER PUBLICATIONS

Examination Report for European Patent Application No. 15863848.6 dated Jul. 18, 2018.

\* cited by examiner

INFORMATION BEARING DEVICES

FIELD

The present disclosure relates to information bearing devices, and more particularly to information bearing devices comprising copy detection means. This disclosure also relates to articles incorporating information bearing devices.

BACKGROUND

Information bearing devices comprising an information bearing pattern are widely used in authentication, identification, tracking, telecommunications, verification, and other applications. For example, information bearing devices such as watermarks or data embedded image patterns are frequently incorporated in documents such as identification documents, certificates, authorization permits; articles such as product tags and labels and valuable articles such as credit cards, currency notes and the like. When information bearing devices are so used, the information bearing patterns characteristic of such devices may be formed as a background image pattern, as a foreground image pattern or as a mixture of both.

Information bearing patterns accompanying information bearing devices for authentication, identification, tracking, verification, and like applications often work with an image capture device and an image of the information bearing patterns so captured will then be utilized for their designed objectives.

With the rapid advancement in image capture technologies and other pattern reproduction techniques, there is an increasing risk that information bearing devices are captured, copied and misused.

DISCLOSURE

There is disclosed an information bearing device comprising a data bearing pattern, wherein the data bearing pattern comprises a plurality of data defining elements, the data defining elements being spatially distributed to define a set of spatial frequency data, and the set of spatial frequency data comprising a plurality of frequency data elements ($F_1$, $F_2$, ..., $F_n$); and wherein each frequency data ($F_i$) has a data frequency magnitude ($f_i$) and a data frequency angle ($\theta_i$), the data frequency magnitude being above a first characteristic spatial frequency ($f_A$) which corresponds to a characteristic frequency of a staple or commonplace image reproduction apparatus, the characteristic frequency representing an image data frequency above which reproduction quality by the staple or commonplace image reproduction apparatus begins to drop substantially.

The data frequency magnitude ($f_i$) of a frequency data ($F_i$) may be at or below a second characteristic spatial frequency ($f_B$), the second spatial frequency being higher than the first characteristic spatial frequency ($f_A$) and corresponding to a characteristic image capture frequency of a state-of-the-art image capture apparatus, such as a held-held smart phone having a high resolution image capture apparatus, the characteristic image capture frequency relating to maximum frequency content or maximum spatial resolution of an image that can be captured by the image capture apparatus.

In example embodiments, the set of spatial frequency data comprises a first group of spatial frequency data and a second group of spatial frequency data, the first group of spatial frequency data comprising one or a plurality of spatial frequency data of a first frequency magnitude and the second group of spatial frequency data comprising one or a plurality of spatial frequency data of a second frequency magnitude higher than the first frequency magnitude, and wherein the second frequency magnitude is proximal or below the second characteristic spatial frequency ($f_B$).

The set of spatial frequency data may comprise a plurality of spatial frequency data of same data frequency magnitude ($f_i$) and different data frequency angles ($\theta_i$).

The second spatial frequency ($f_B$) may for example be at least 100%, 150%, 200%, 250%, 300%, 350%, 400%, 450%, 500%, 550%, 600%, 650% or 700% or higher and/or there-between than the first spatial frequency ($F_A$).

The first spatial frequency ($f_A$) may for example be at or above 150 LPI, at or above 175 LPI, at or below 200 LPI and/or at or below 250 LPI.

The second spatial frequency ($f_B$) may for example be at or above 300 LPI, at or above 400 LPI, at or above 500 LPI, at or above 600 LPI, at or above 700 LPI, at or above 800 LPI, at or above 900 LPI, and/or at or above 1000 LPI, and/or there-between.

In some embodiments, the data defining elements are distributed such that there is at least one first frequency data element ($F_1$) having a first data frequency magnitude ($f_1$) and one second frequency data element ($F'_2$) having a second data frequency magnitude ($f_2$), the second data frequency magnitude ($f_2$) being higher than the first data frequency magnitude ($f_1$).

In some embodiments, the second data frequency magnitude ($f_2$) is higher than tyre first data frequency magnitude ($f_1$) at least by 50 LPI, at least by 60 LPI, at by 70 LP, or by 100 LPI and/or there-between.

The orthogonal separation of adjacent spatial frequency data from or with respect to a radial axis extending from frequency domain origin may be less than or no more than 15 LPI, 20 LPI, 30 LPI, 40 LPI, 50 LPI, 60 LPI, 70 LPI, 80 PI 90 LPI, 100 LPI, 110 LPI, 120 LPI, 125 LPI, or 130 LPI and/or there-between.

The orthogonal separation of adjacent spatial frequency data from or respect to a radial axis extending from frequency domain origin may be higher than 15 LPI, 20 LPI, 30 LPI, 40 LPI 50 LPI, 60 LPI, 70 LPI, 80 LPI, 90 LPI, 100 LPI and/or there-between.

The window width being orthogonal to an axis extending and passing through an origin of a pair of orthogonal frequency axes (u,v).

The set of spatial frequency data elements may comprise a plurality of n frequency data ($F_{1,n}$) having a first data frequency magnitude ($f_1$) and different data frequency angles ($\theta_{1,i}$), where i=1, 2, 3, ..., or n, and a plurality of n frequency data having a second data frequency magnitude ($f_2$) higher than the first data frequency magnitude ($f_1$) and different data frequency angles ($\theta_{2,i}$), and wherein ($\theta_{1,i}$)=($\theta_{2,i}$).

Adjacent spatial frequency data may be arranged such that the difference in angular orientation is adapted to facilitate detection when an image of the data bearing pattern is to be captured with a handheld device subject to hand tremor of a user.

There is also disclosed an authentication device comprising an information bearing device according to any preceding claim, wherein the data bearing pattern is encoded with the frequency data elements for use as authentication data.

An information bearing device having a plurality of data defining elements distributed at different frequency magnitudes is advantageous.

For example, by disposing the data defining elements such that there is or are spatial frequency data at higher frequencies would provide useful information on whether an information bearing device was copied by an image capturing apparatus having a characteristic frequency lower than the higher frequencies.

For example, by disposing the data defining elements such that there is or are spatial frequency data at lower frequencies would be useful to help recover information when an information bearing device is copied by an image capturing apparatus subject to hand tremor distortion.

By disposing the data defining elements such that there are spatial frequency data intermediate the lower and upper frequencies would assist detection of history of copying of information bearing device.

By disposing the data defining elements at a plurality of angular orientations would assist recovery of information when subject to hand tremor distortion.

FIGURES

The disclosure will be described by way of example with reference to the accompanying Figures, in which.

DESCRIPTION

Figure 1:
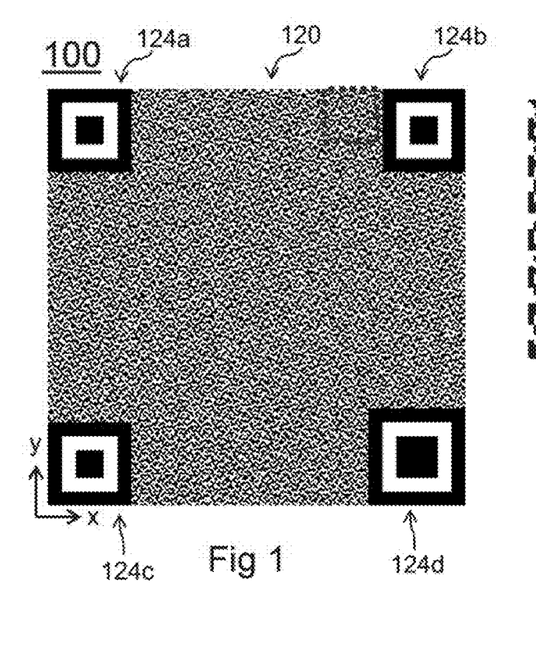
FIG. 1 shows an example information bearing device.
Figure 1A:
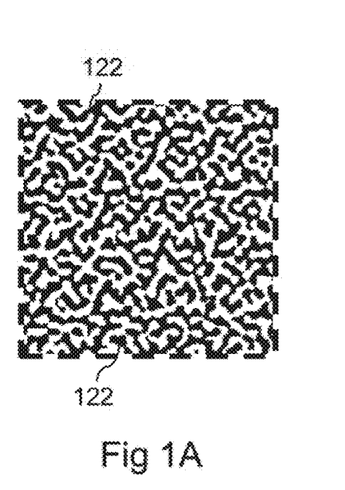
FIG. 1A shows an enlarged portion of a data bearing pattern of FIG. 1.

An example information bearing device 100 depicted in FIG. 1 comprises a data bearing pattern 120 and an alignment arrangement. The data bearing pattern is defined by data defining elements 122 which are distributed to define a plurality of spatial frequency data ($F_{n,m}$). A portion of the data bearing pattern contained in an identification window shown in dotted lines in FIG. 1 is enlarged and shown in FIG. 1A. For the avoidance of doubt, the dotted window is only for identification and is not present in an actual device. The data defining elements 122 are spatially distributed according to distribution rules to correspond to a plurality of spatial frequency data ($F_{n,m}$). In this example device, the data defining elements 122 are spatially distributed to correspond to a plurality of twenty eight spatial frequency data arranged into a plurality of four spatial frequency groups of spatial frequencies ($f_1$, $f_2$, $f_3$, $f_4$). As a convenient shorthand, a spatial frequency data ($F_{n,m}$) has the same frequency magnitude as that of $f_n$. More specifically, there are four spatial frequency data of frequency $f_1$, six spatial frequency data of frequency $f_2$, eight spatial frequency data of frequency $f_3$ and ten spatial frequency data of frequency $f_4$, where f is 151 LPI, $f_2$ is 193 LPI, $f_3$ is 241 LPI and $f_4$ is 292 LPI.

The spatial frequency data of the first frequency group $f_1$ have the following coordinate values when represented using a set of orthogonal frequency domain axes (u,v):

TABLE 1

|   | $F_{1,1}$ | $F_{1,2}$ | $F_{1,3}$ | $F_{1,4}$ |
|---|---|---|---|---|
| u | 121 | 45 | −47 | −122 |
| v | 89 | 143 | 142 | 87 |

The spatial frequency data of the second frequency group $f_2$ have the following (u,v) coordinate values:

TABLE 2

|   | $F_{2,1}$ | $F_{2,2}$ | $F_{2,3}$ | $F_{2,4}$ | $F_{2,5}$ | $F_{2,6}$ |
|---|---|---|---|---|---|---|
| u | 173 | 119 | 41 | −43 | −122 | −175 |
| v | 84 | 152 | 191 | 191 | 152 | 84 |

The spatial frequency data of the first frequency group $f_3$ have the following (u,v) coordinate values:

TABLE 3

|   | $F_{3,1}$ | $F_{3,2}$ | $F_{3,3}$ | $F_{3,4}$ | $F_{3,5}$ | $F_{3,6}$ | $F_{3,7}$ | $F_{3,8}$ |
|---|---|---|---|---|---|---|---|---|
| u | 226 | 183 | 119 | 41 | −43 | −122 | −185 | −229 |
| v | 84 | 157 | 211 | 239 | 239 | 211 | 157 | 84 |

The spatial frequency data of the first frequency group $f_4$, have the following (u,v) coordinate values:

TABLE 4

|   | $F_{4,1}$ | $F_{4,2}$ | $F_{4,3}$ | $F_{4,4}$ | $F_{4,5}$ | $F_{4,6}$ | $F_{4,7}$ | $F_{4,8}$ | $F_{4,9}$ | $F_{4,10}$ |
|---|---|---|---|---|---|---|---|---|---|---|
| u | 279 | 244 | 191 | 119 | 41 | −43 | −122 | −193 | −246 | −282 |
| v | 84 | 160 | 221 | 267 | 290 | 290 | 267 | 221 | 160 | 84 |

In the example (u,v) coordinate system used herein, the u-axis represents or corresponds to spatial repetition frequency of the data defining elements 122 in the x-direction and the v-axis represents or corresponds to spatial repetition frequency of the data defining elements 122 in the y-direction. The spatial frequency unit is in lines-per-inch (LPI). The LPI system is widely used, if not prevailing, in the printing industry and is therefore used. For conversion with the metric system, 100 LPI is equal to approximately 39.4 lines-per-cm.

The spatial frequency data ($F_{n,m}$) are also representable as ($f_i$, $\theta_i$) in the circular or polar coordinate system, where $f_i$ is the frequency magnitude of the spatial frequency data and $\theta_i$ is the anti-clockwise angular distance in degree (°) from the zero-angle reference axis which overlaps the u-axis.

The example information bearing device 100 of FIG. 1 has a width of 0.39 inch (~1 cm) in the x-direction and a length of 0.39 inch (~1 cm) in the y-direction. There are 944 pixels in the x-direction and 944 pixels in the y-direction so that the information bearing device 100 has a total of 944×944 pixels.

The alignment arrangement comprises four alignment devices 124a, 124b, 124c, 124d, which are distributed at four corners of the information bearing device 100. Each alignment device comprise visually contrasting elements to assist alignment of the information bearing device 100 with an image capture apparatus to facilitate efficient and expedient capturing of an image of the information bearing device 100. The data defining elements 122 are distributed in the region delineated or contained by the four alignment devices 124a, 124b, 124c, 124d.

Figure 1B:
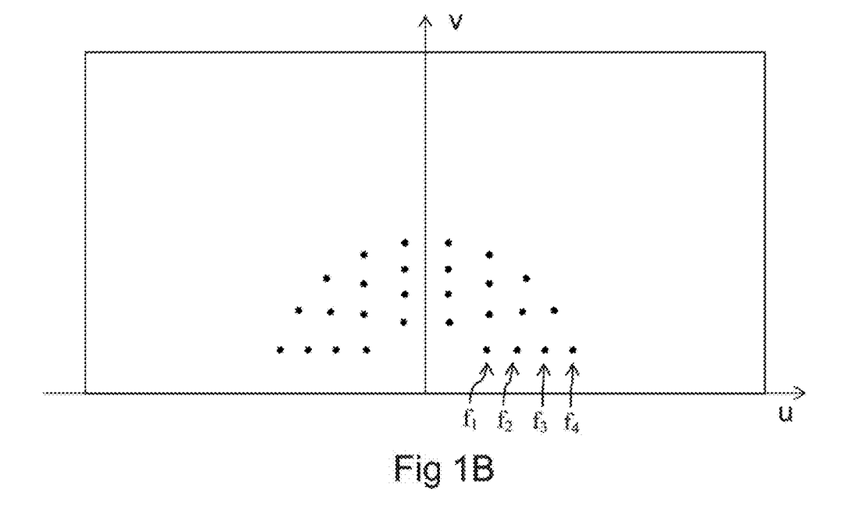
FIG. 1B is a schematic view showing spatial frequency data embedded in the data bearing pattern of FIG. 1.

The data bearing pattern 120 comprises spatial frequency data of different frequency magnitudes, as depicted in FIG. 1B. Referring to FIG. 1B, a spatial frequency data which is further away from the origin has a frequency magnitude which is higher than the frequency magnitude of a spatial frequency data which is closer to the origin and a spatial frequency data which is closer to the origin has a frequency magnitude which is lower than the frequency magnitude of a spatial frequency data which is further away from the origin. For example, the spatial frequency data ($F_{4,5}$) has a frequency magnitude (292 LPI) of about 51 LPI higher than the frequency magnitude (241 LPI) of spatial frequency data ($F_{3,4}$), the spatial frequency data ($F_{3,4}$) has a frequency magnitude (241 LPI) of about 48 LPI higher than the frequency magnitude (193 LPI) of spatial frequency data ($F_{2,3}$) and the spatial frequency data ($F_{1,2}$) has a frequency magnitude (193 LPI) of about 42 LPI higher than the frequency magnitude (151 LPI) of spatial frequency data ($F_{1,2}$). The spatial frequency data ($F_{4,5}$) has a frequency magnitude of about 100 LPI higher than the frequency magnitude of spatial frequency data ($F_{2,3}$) and about 150 LPI higher than the frequency magnitude of spatial frequency data ($F_{1,2}$). Likewise, spatial frequency data ($F_{3,4}$) has a frequency magnitude of about 100 LPI higher than the frequency magnitude of spatial frequency data ($F_{1,2}$).

Figure 2:
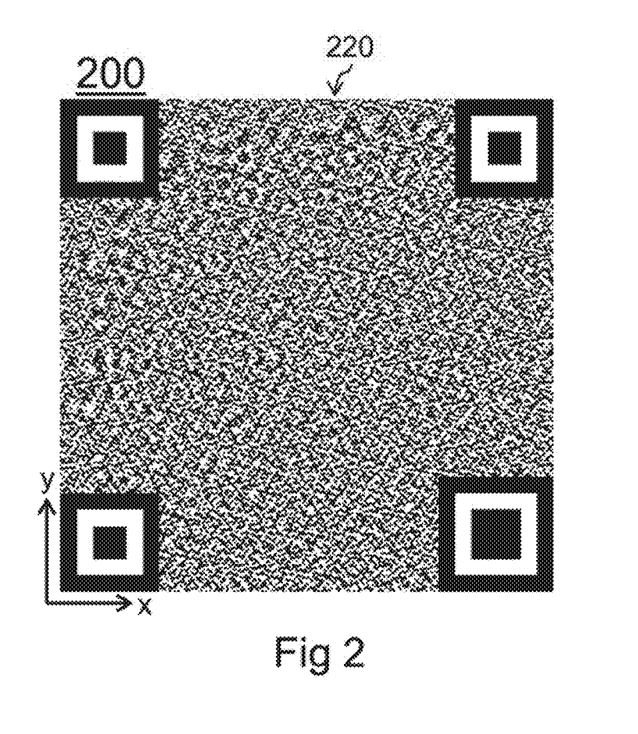
FIG. 2 shows an example information bearing device.

The frequency magnitudes of the spatial frequency data ($F_{n,m}$) are set or selected to be between frequency limits, ($f_A$) and ($f_B$), as depicted in FIG. 2. In this example, $f_A$ is 150 LPI and $f_B$ is 300 LPI. The value of $f_A$ is selected since this is a typical characteristic frequency of a staple or commonplace image reproduction apparatus such as a thermal printer. The characteristic frequency of a staple or commonplace image reproduction apparatus corresponds to an image content frequency at which the quality of reproduction by the staple or commonplace image reproduction apparatus begins to drop, and degradation is more noticeable if the image content frequency is substantially higher than the characteristic frequency.

It is noted that a spatial frequency data having a higher frequency may be more prone or more vulnerable to degradation due to copying than one having lower frequency. It is also noted that a spatial frequency data having a specific frequency may be more prone or more vulnerable to degradation due to copying than one having another frequency due to property of the copier. By setting the frequency magnitudes of the spatial frequency data ($F_{n,m}$) at several discrete frequency magnitudes above ($f_A$), degradation or differences in degradation can be utilised to detect copying and can be useful as an anti-counterfeiting measure. While 150 LPI is a typical characteristic frequency, the characteristic frequency may range from 100 LPI to 200 LPI and ($f_A$) may be set according to a target characteristic frequency without loss of generality.

In this example, a spatial frequency difference of approximately 50 LPI between adjacent frequency groups has been selected so that four frequency groups can be distributed quite evenly or at quite uniform spacing between a frequency range of about 150 LPI between two frequency limits, namely, ($f_A$) and ($f_B$). This spatial frequency difference has been found to provide useful information for detection of copying or reproduction. For applications, the frequency differences between adjacent frequency groups of spatial frequency data may be set to be higher or lower than 50 LPI, for example, about 20 LPI, 25 LPI, 30 LPI, 35 LPI, 40 LPI, 50 LPI, 60 LPI, 70 LPI, 80 LPI, 90 LPI, 100 LPI or above, or any values there-between, depending on the range of frequency defined by the frequency limits ($f_A$) and ($f_B$) and/or the number of spatial frequency data to be devised in the data bearing pattern 120.

The upper frequency limit ($f_B$) is selected to be set at a characteristic frequency of a high-fidelity image capture device, such as a smart phone, so that an image of the data bearing pattern 120 can be captured for analyses. In order that the high-fidelity image capture device can detect copying by a staple or commonplace image reproduction apparatus, the characteristic frequency of the high-fidelity image capture device must be substantially higher than that of staple or commonplace image reproduction apparatus. For example, a state-of-the-art high-fidelity image capture device such as a smart phone or other handheld device has a characteristic frequency of between 300 LPI to 1000 LPI. For example, an iPhone® 5S having 8 million pixels when taking an image of an information bearing pattern of dimensions 1 inch×1 inch at a minimum focusing distance of 12 cm would produce an image of about 300 LPI, a Samsung® S4 smartphone having 13 million pixels when taking an image of an information bearing pattern of dimensions 1 inch×1 inch at a minimum focusing distance of 5.5 cm would produce an image of about 1000 LPI. The actual value of $f_B$ may be selected accordingly and as appropriate without loss of generality. A staple or commonplace image capture device is also referred to as a 'low-fidelity' or 'lower fidelity' image capture device herein in contrast to a 'high-fidelity' or 'higher fidelity' image capture device having a characteristic frequency around or above $f_B$.

In the iPhone5S® example, the example smart phone has a camera resolution of 3264*2448=8*10$^6$ pixels and at a 12 cm focus-distance it can capture an image of an object of size no larger than 5.35 inch*4.06 inch. As 2448/4.06≈3264/5.35≈600 pixels-per-inch and a visible line comprises at least a line of black pixels and an adjacent parallel line of white pixels. Therefore, this example smart phone can capture images at 600/2=300 LPI at a 12 cm focus-distance.

In the Samsung® S4 example, the example smart phone has a camera resolution of 4128*3096=13*10$^6$ pixels and at a 5.5 cm focus-distance it can capture an image of an object of size no larger than 2.17 inch*1.61 inch. As 3096/1.61≈4128/2.17≈1910 pixels-per-inch and a visible line comprises at least a line of black pixels and an adjacent parallel line of white pixels. Therefore, this example smart phone can capture images at 1910/2≈1000 LPI at a 5.5 cm focus-distance.

In some embodiments, the data bearing pattern may include spatial frequency data corresponding to characteristic frequencies of a plurality of staple or commonplace image reproduction apparatus. For example, a common type of staple copier may have a first characteristic frequency of 150 LPI and a common type of low-resolution thermal printer may have a second characteristic frequency 200 LPI.

By setting the spatial frequency data such that there are first spatial frequency data at or about the first characteristic frequency, second spatial frequency data at or about the second characteristic frequency, third spatial frequency data having a frequency intermediate the first and second characteristic frequencies, and/or fourth spatial frequency data having a frequency above the second characteristic frequency, the spatial frequency data recovered from a copied image would provide useful information on what type of apparatus was used to copy the data bearing pattern.

While a data bearing pattern 120 containing spatial frequency data ($F_{n,m}$) components having a frequency above or higher than the characteristic frequency of a staple or commonplace image reproduction apparatus is useful for copying detection or for use as an anti-copying device, the higher frequency spatial frequency data components are more susceptible or prone to distortion when the information bearing device 100 is reproduced by a staple or commonplace image reproduction apparatus. Furthermore, the higher frequency spatial frequency data components are more susceptible or prone to distortion when the information bearing device 100 is captured by using a handheld image capturing apparatus under hand-tremor. Image distortion due to hand tremor typically appears as blurring, (i.e. motion blur), both in the captured image and in spatial frequency data of the captured image.

In devising a data bearing pattern according to the present disclosure, it would be beneficial to have at least one frequency group having an upper frequency $f_4$ which is close or proximal to the upper frequency limit ($f_B$) and at least one frequency group having a lower frequency $f_1$ which is close or proximal to the lower frequency limit ($f_A$). The frequency difference or separation between the upper frequency group or upper frequency data (the "upper frequency group") and the lower frequency group or lower frequency data (the "lower frequency group") can be several hundred LPI or above a thousand LPI, for example, can be 100 LPI, 150 LPI, 200 LPI, 250 LPI, 350 LPI, 400 LPI, 500 LPI, 600 LPI, 700 LPI, 800 LPI, 900 LPI, etc. or above, or any values there-between, depending on the characteristic frequencies of the target image reproduction apparatus. In some embodiments, a frequency difference or separation of about 50 LPI between the upper frequency group (or upper frequency data) and the lower frequency group (or lower frequency data) has shown to produce useful and advantageous information and effect.

To mitigate adverse effects due to motion blurring, the spatial frequency data are devised or distributed such that there is at least one spatial frequency data within a 'hand-tremor' window. An example 'hand-tremor' window is set with reference to planar hand tremor motion of a user which occurs while taking an image by using a hand-held image capture device and by hand holding the hand-held device.

Assuming that there is a planar shift of a distance of $\Delta X$ due to planar hand-tremor while taking an image of an object of size X×X and the captured image has a total of M×M pixels, there would be a planar shift of $\Delta M$ pixels in the image such that $$\frac{\Delta M}{M} = \frac{\Delta X}{X}.$$

Figure 1C:
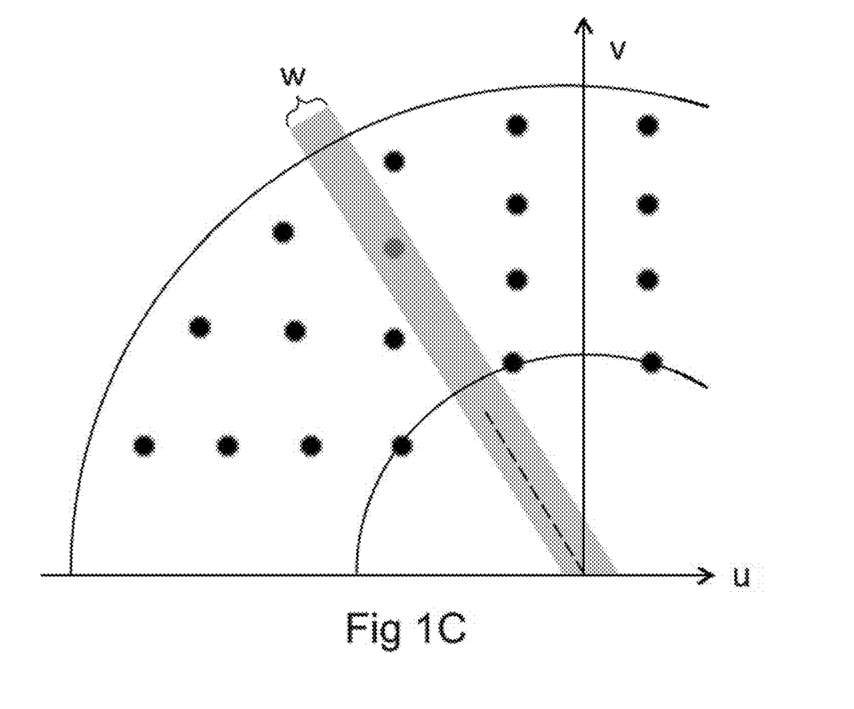
FIG. 1C is an enlarged portion of the schematic view of FIG. 1B showing application of a 'hand-tremor' window and a plurality of spatial frequency data.

In general, $\Delta X \leq 0.05$ cm for a normal user. A window which extends radially from and passes through origin (0, 0) of the (u,v) coordinate system, and having a width W in a direction transverse to the radial direction such that $$W = \frac{2M}{\Delta M + 1}$$

is set, as depicted in FIG. 1C. By distributing the spatial frequency data such that there is at least one complete spatial frequency data which is within boundary of a 'hand-tremor' window ("Window") irrespective or regardless of the angular orientation of the Window, at least one spatial frequency data can be recovered even if an image is taken with distortion caused by planar hand-tremor motion of a user. In an example where X×X=1 cm×1 cm and M×M=512×512 pixels, $\Delta X=0.05$ cm, $\Delta M$ can be taken as approximately 20 pixels practically and an example window width is W≈50 pixels, corresponding to 50 lines-per-cm or 127 LPI.

Where an example captured image has a total of M×N pixels respectively in the x- and y-directions, and $\Delta X$ represents a normal spatial shift in the x-direction during hand-held image capturing by a normal user, the amount of spatial shift in pixel terms $\Delta M$ of the pattern in a captured image and the amount of spatial shift in distance terms are related by the expression $$\frac{\Delta M}{M} = \frac{\Delta X}{X}$$

and the window width $$W = \frac{2M}{\Delta M + 1}.$$

Where shift is in the y-direction, the expression is $$\frac{\Delta N}{N} = \frac{\Delta Y}{Y}$$

and the window width $$W = \frac{2N}{\Delta N + 1}$$

without loss of generality.

Figure 1D:
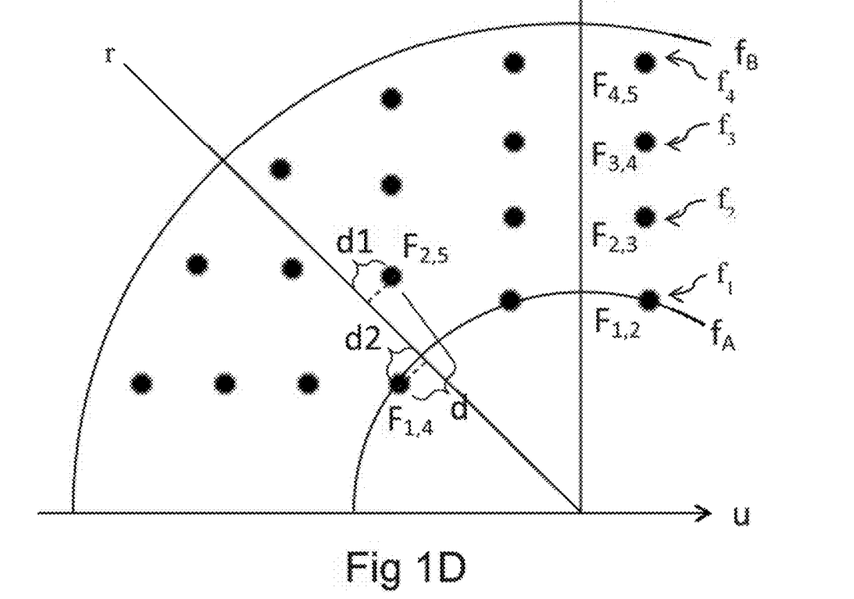
FIG. 1D is an enlarged portion of the schematic view of FIG. 1B showing an imaginary radial axis and a plurality of spatial frequency data.

Referring to FIG. 1D, spatial frequency data ($F_{2,5}$) has an orthogonal separation or projection distance of $d_1$ from a radial axis (r) extending from original of the (u,v) axes, and spatial frequency data ($F_{1,4}$) has an orthogonal separation or projection distance of $d_2$ from the radial axis, where $d_1$, $d_2$ are in LPI. By having r such that $d_1=d_2=d$ and determining whether d is larger than (>) or smaller or equal to (≤)W/2, it can be determined whether there is at least one spatial frequency data that falls within the hand-tremor window. Specifically, there is at least one spatial frequency data that falls within the hand-tremor window if d is smaller or equal to $$\frac{W}{2}.$$

The sum of $d_1+d_2$ is referred to herein as the "projective-sum" distance between spatial frequency data ($F_{2,5}$) and spatial frequency data ($F_{1,4}$). Therefore, in devising spatial frequency data, it would be advantageous to distribute or dispose the spatial frequency data such that the "projective-sum" distance between some pairs of spatial frequency data is less than the window width W and for windows at all angular orientations. In this example, $d_1+d_2$ has a projective sum of 46 LPI. Other pairs of spatial frequency data can also have their angular orientation separation quantified in terms of their projective-sum distance. By having a least one or a plurality of pairs of spatial frequency data having a projective sum distance less than the window width W, at least one spatial frequency data can be recovered from a blurred image even though the captured image is planar-motion blurred due to hand-tremor of a normal user. The projective sum distances of pairs of spatial frequency data are set to correspond to the hand-tremor window which is set with reference to planar hand tremor motion amplitude of a normal user without loss of generality.

In devising a data bearing pattern, spatial frequency data are disposed and distributed on the (u,v) axes with the lower frequency limit ($f_A$), upper frequency limit ($f_B$), frequency magnitude of the upper frequency group ($f_4$), frequency magnitude of the lower frequency group ($f_1$), number of frequency groups between the upper and lower frequency groups, width (W) of the hand-tremor window, and/or overall number of spatial frequency data in consideration. After the number and disposition of the spatial frequency data have been determined, the spatial frequency data are converted into a data bearing pattern, for example by application of reverse Fourier Transform.

To analyse a data bearing pattern according to the present disclosure, an image of the data bearing pattern is captured. The captured pattern is then processed to extract the spatial frequency data from spatial domain information obtained from the captured image, for example, by Fourier transform, and the extracted spatial frequency data can be examined in the spatial frequency domain with reference to the (u,v) coordinate based on spatial repetition frequency.

Figure 2A:
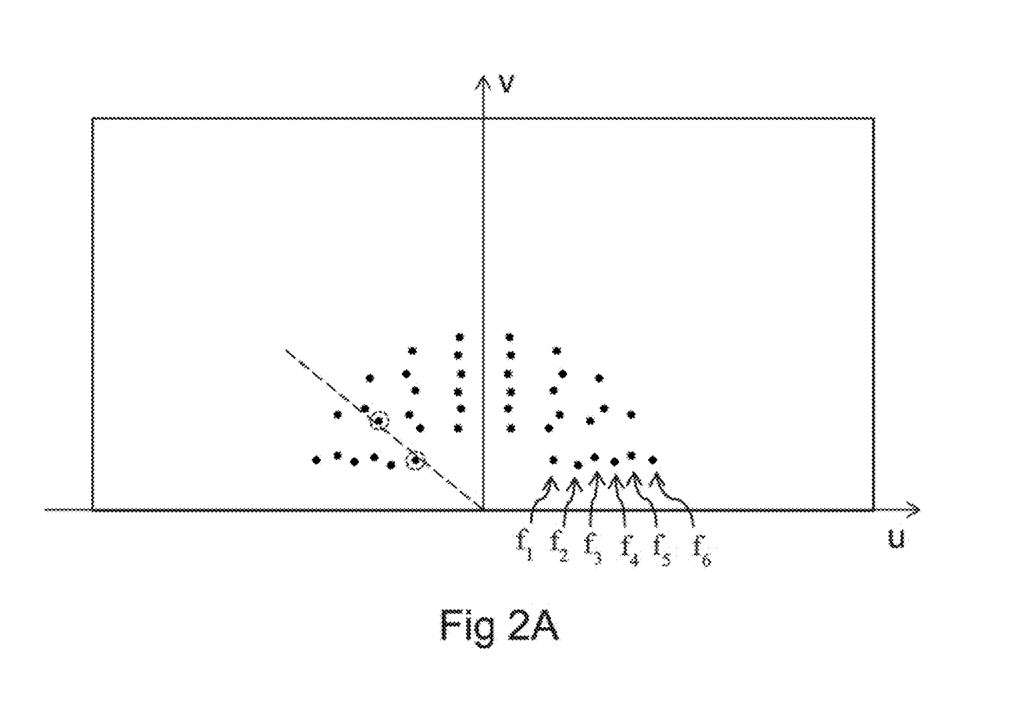
FIG. 2A is a schematic view showing spatial frequency data embedded in the data bearing pattern of FIG. 2.

An example information bearing device 200 depicted in FIG. 2 comprises a data bearing pattern 220 and an alignment arrangement. The data bearing pattern 220 is defined by data defining elements which are distributed to define a plurality of spatial frequency data ($F_{n,m}$). The data defining elements are spatially disposed or distributed in a manner substantially identical to those of the information bearing device 100 and the description herein relating to the information bearing device 100 is incorporated herein mutatis mutandis. In this example device, the data defining elements are spatially distributed to correspond to a plurality of spatial frequency data arranged into a plurality of six spatial frequency groups of spatial frequencies ($f_1$, $f_2$, $f_3$, $f_4$, $f_5$, $f_6$) as depicted in FIG. 2A and as below:

TABLE 5

|  | $f_1$ | $f_2$ | $f_3$ | $f_4$ | $f_5$ | $f_6$ |
|---|---|---|---|---|---|---|
|  | 150 | 175 | 205 | 232 | 262 | 293 |
| $\Delta_1$ |  |  |  | 143 |  |  |
| $\Delta_2$ |  |  | 30 |  | 30 |  |
| $\Delta_3$ |  | 25 |  | 27 |  | 31 |

In the above table 5, $\Delta_1$ is the frequency difference between the upper ($f_6$) and lower ($f_1$) frequency group, and $\Delta_2$ and $\Delta_3$ are the frequency differences between adjacent frequency groups ($f_1$, $f_2$, $f_3$, $f_4$, $f_5$, $f_6$). In the example of FIG. 2A, the projective-sum distance between the circled spatial frequency data is equal to 14 LPI.

Figure 3:
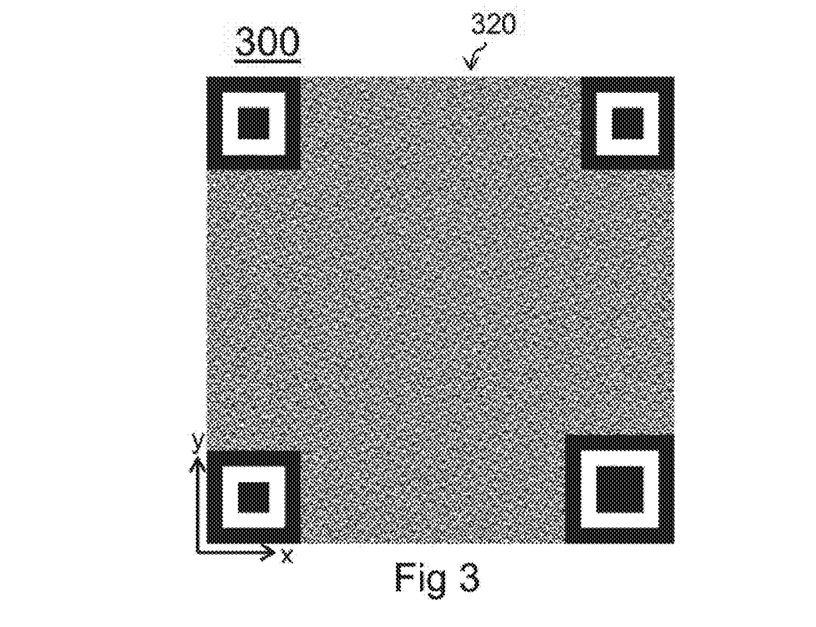
FIG. 3 shows an example information bearing device.

An example information bearing device 300 depicted in FIG. 3 comprises a data bearing pattern 320 and an alignment arrangement. The data bearing pattern 320 is defined by data defining elements which are distributed to define a plurality of spatial frequency data ($F_{n,m}$). The data defining elements are spatially disposed or distributed in a manner substantially identical to those of the information bearing device 200 except that the spatial frequency data of the same frequency group are distributed with substantially uniform separation and the description herein relating to the information bearing device 200 is incorporated herein mutatis mutandis.

Figure 3A:
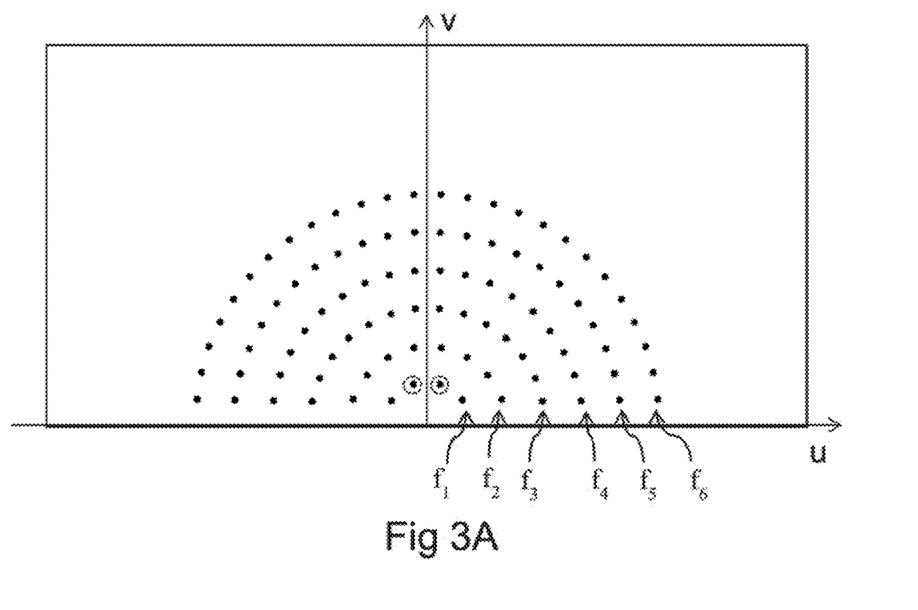
FIG. 3A is a schematic view showing spatial frequency data embedded in the data bearing pattern of FIG. 3, and FIGS. 4A, 4B and 4C show various spatial frequency data arrangements.

In this example device, the data defining elements are spatially distributed to correspond to a plurality of spatial frequency data arranged into a plurality of six spatial frequency groups of spatial frequencies ($f_1$, $f_2$, $f_3$, $f_4$, $f_5$, $f_6$) as depicted in FIG. 3A and as below:

TABLE 6

|  | $f_1$ | $f_2$ | $f_3$ | $f_4$ | $f_5$ | $f_6$ |
|---|---|---|---|---|---|---|
|  | 150 | 272 | 405 | 535 | 666 | 795 |
| $\Delta_1$ |  |  |  | 645 |  |  |
| $\Delta_2$ |  |  | 133 |  | 131 |  |
| $\Delta_3$ |  | 122 |  | 130 |  | 129 |

In the above table 6, $\Delta_1$ is the frequency difference between the upper ($f_6$) and lower ($f_1$) frequency group, and $\Delta_2$ and $\Delta_3$ are the frequency differences between adjacent frequency groups ($f_1$, $f_2$, $f_3$, $f_4$, $f_5$, $f_6$). In the example of FIG. 3A, the projective-sum distance between the circled spatial frequency data is within 127 LPI.

Referring to FIG. 3A, the spatial frequency data of the same frequency group are evenly distributed such that the separation between adjacent spatial frequency data is substantially identical.

Figure 4A:
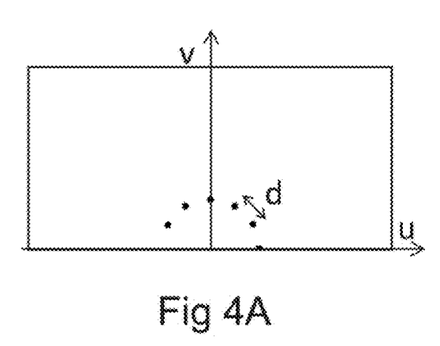

A plurality of spatial frequency data forming a spatial frequency group $f_i$ of a data bearing pattern comprising a plurality of spatial frequency groups ($f_1$, ..., $f_n$) is depicted in FIG. 4A, in which $f_i$ can be any one of ($f_1$, ..., $f_n$). In this example, the spatial frequency data are distributed such that the angular adjacent spatial frequency data of the same group is separated by a projective-sum distance less than the width of hand-tremor window. For example, the spatial frequency group $f_i$ has a frequency magnitude of 150 LPI and d=127 LPI.

Figure 4B:
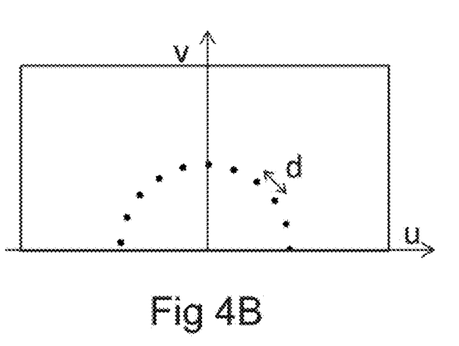

A plurality of spatial frequency data forming a spatial frequency group $f_j$ of a data bearing pattern comprising a plurality of spatial frequency groups ($f_1$, ..., $f_n$) is depicted in FIG. 4B, in which $f_j$ can be any one of ($f_1$, ..., $f_n$). In this example, the spatial frequency data are distributed such that the angular adjacent spatial frequency data of the same group is separated by a projective-sum distance less than the width of hand-tremor window. For example, the spatial frequency group $f_L$ has a frequency magnitude of 300 LPI and d=127 LPI.

Figure 4C:
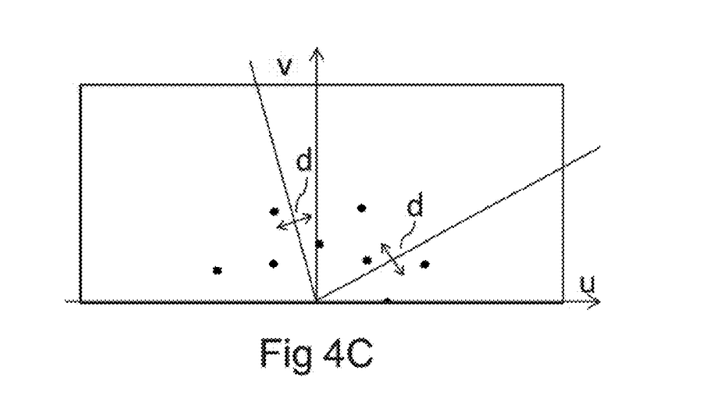

A plurality of spatial frequency data forming two spatial frequency groups $f_s$, $f_t$ of a data bearing pattern comprising a plurality of spatial frequency groups ($f_1$, ..., $f_n$) is depicted in FIG. 4c, in which $f_s$, $f_t$ can be any one of ($f_1$, ..., $f_n$) and $f_s < f_t$. Angularly adjacent pairs of spatial frequency data have d=127 LPI.

While the disclosure has been described herein with reference to examples, the examples are not intended and should not be used to limit the scope of disclosure.

The invention claimed is:

1. An information bearing device comprising a data bearing pattern, wherein the data bearing pattern comprises a plurality of data defining elements and the data defining elements are spatially distributed to define a set of spatial frequency data comprising a plurality of frequency data elements; and wherein each frequency data element has a data frequency magnitude and a data frequency angle, the data frequency magnitude being above a first characteristic spatial frequency which corresponds to a characteristic frequency of an image reproduction apparatus, the characteristic frequency representing an image data frequency above which reproduction quality by the image reproduction apparatus begins to drop.

2. An information bearing device according to claim 1, wherein the data frequency magnitude of a frequency data element is at or below a second characteristic spatial frequency, the second spatial frequency being higher than the first characteristic spatial frequency and corresponding to a characteristic image capture frequency of a state-of-the-art image capture apparatus, such as a held-held smart phone having a high resolution image capture apparatus, the characteristic image capture frequency relating to maximum frequency content or maximum spatial resolution of an image that can be captured by the image capture apparatus.

3. An information bearing device according to claim 1, wherein the set of spatial frequency data comprises a first group of spatial frequency data and a second group of spatial frequency data, the first group of spatial frequency data comprising one or a plurality of spatial frequency data of a first frequency magnitude and the second group of spatial frequency data comprising one or a plurality of spatial frequency data of a second frequency magnitude higher than the first frequency magnitude, and wherein the second frequency magnitude is proximal or below the second characteristic spatial frequency.

4. An information bearing device according to claim 3, wherein the first frequency magnitude is at, proximal or above the first characteristic spatial frequency.

5. An information bearing device according to claim 3, wherein the second frequency magnitude is higher than the first frequency magnitude by at least 40 LPI, at least 50 LPI, at least 60 LPI, at least 70 LPI, at least 80 LPI, at least 90 LPI, or at least 100 LPI.

6. An information bearing device according to claim 3, wherein the second frequency magnitude is higher than the first frequency magnitude by at least 100 LPI, at least 150 LPI, at least 200 LPI, at least 250 LPI, at least 300 LPI, at least 350 LPI, at least 400 LPI, at least 450 LPI, at least 500 LPI, at least 550 LPI, at least 600 LPI, at least 700 LPI, at least 800 LPI, or more and/or any range or ranges defined between the afore-said values.

7. An information bearing device according to any of claim 3, wherein the set of spatial frequency data comprises a third group of spatial frequency data, the third group of spatial frequency data comprising one or a plurality of spatial frequency data of a third frequency magnitude, the third frequency magnitude being intermediate the first frequency magnitude and the second frequency magnitude.

8. An information bearing device according to claim 7, wherein third frequency magnitude is lower than the second frequency magnitude by at least 20 LPI, 25 LPI, 30 LPI, 35 LPI, 40 LPI, 45 LPI, 50 LPI, 60 LPI, 70 LPI, 80 LPI, 90 LPI, 100 LPI, 125 LPI, 150 LPI, 200 LPI, 250 LPI or more and/or any range or ranges defined between the afore-said values.

9. An information bearing device according to claim 7, wherein the third frequency magnitude is higher than the first frequency magnitude by at least 20 LPI, 25 LPI, 30 LPI, 35 LPI, 40 LPI, 45 LPI, 50 LPI, 60 LPI, 70 LPI, 80 LPI, 90 LPI, 100 LPI, 125 LPI, 150 LPI, 200 LPI, 250 LPI or more and/or any range or ranges defined between the afore-said values.

10. An information bearing device according to claim 7, wherein the set of spatial frequency data comprises a fourth group of spatial frequency data, the fourth group of spatial frequency data comprising one or a plurality of spatial frequency data of a fourth frequency magnitude, the fourth frequency magnitude being intermediate the third frequency magnitude and the second frequency magnitude or being intermediate the third frequency magnitude and the first frequency magnitude.

11. An information bearing device according to claim 10, wherein the fourth frequency magnitude is lower than or higher than the third frequency magnitude by at least 20 LPI, 25 LPI, 30 LPI, 35 LPI, 40 LPI, 45 LPI, 50 LPI, 60 LPI, 70 LPI, 80 LPI, 90 LPI, 100 LPI, 125 LPI, 150 LPI, 200 LPI, 250 LPI or more and/or any range or ranges defined between the afore-said values.

12. An information bearing device according to claim 10, wherein the fourth frequency magnitude is lower than the second frequency magnitude or higher than the first frequency magnitude at least 20 LPI, 25 LPI, 30 LPI, 35 LPI, 40 LPI, 45 LPI, 50 LPI, 60 LPI, 70 LPI, 80 LPI, 90 LPI, 100 LPI, 125 LPI, 150 LPI, 200 LPI, 250 LPI or more and/or any range or ranges defined between the afore-said values.

13. An information bearing device according to claim 1, wherein the spatial frequency data comprises a plurality of spatial frequency data elements of same frequency magnitude and a plurality of different data frequency angles.

14. An information bearing device according to claim 13, wherein the plurality of different data frequency angles comprises more than 2, more than 3, more than 4, more than 5, more than 6, more than 7, more than 8, more than 9, or more than 10 different data frequency angles and/or any range or ranges defined between the afore-said values.

15. An information bearing device according to claim 14, wherein the plurality of spatial frequency data elements of same frequency magnitude and different data frequency angles comprises spatial frequency data elements separated by more than 10°, more than 15°, more than 20°, more than 25°, or more than 30° and/or any range or ranges defined between the afore-said values.

16. An information bearing device according to claim 1, wherein the data defining elements are distributed such that there is at least one frequency data element which is located within a hand-tremor window, the hand-tremor window being a frequency window which is set and/or determined with reference to typical hand tremor motion of a normal user when capturing an image of said data bearing pattern using a mobile or handheld image capturing device.

17. An information bearing device according to claim 16, wherein the separation of frequency data elements is set and/or determined with reference to amplitude of likely or potential hand tremor motion of a user when capturing an image of said data bearing pattern using a mobile or handheld image capturing device.

18. An information bearing device according to claim 16, wherein the separation of frequency data elements is of or less than 20 LPI, 30 LPI, 40 LPI, 50 LPI, 60 LPI, 80 LPI, 100 LPI, 110 LPI, 120 LPI, less than 125 LPI, or less than 130 LPI, and wherein the window width is orthogonal to an axis extending and passing through an origin of a pair of orthogonal frequency axes.

19. An information bearing device according to claim 1, wherein a plurality of pairs of spatial frequency data elements are arranged such that the difference in angular separation of the spatial frequency data of each pair is within a hand-tremor window to facilitate detection when an image of the data bearing pattern is to be captured with a handheld device and subject to hand tremor of a user.

20. An authentication device comprising an information bearing device, wherein the information bearing device comprises a data bearing pattern and the data bearing pattern comprises a plurality of data defining elements, wherein the data defining elements are spatially distributed to define a set of spatial frequency data, and the set of spatial frequency data comprises a plurality of frequency data elements; and wherein each frequency data element has a data frequency magnitude and a data frequency angle, the data frequency magnitude being above a first characteristic spatial frequency which corresponds to a characteristic frequency of an image reproduction apparatus, the characteristic frequency representing an image data frequency above which reproduction quality by the image reproduction apparatus begins to drop.

\* \* \* \* \*